United States Patent
Takagi et al.

(10) Patent No.: US 8,824,767 B2
(45) Date of Patent: Sep. 2, 2014

(54) CELL-IMAGE ANALYZING APPARATUS

(75) Inventors: Kosuke Takagi, Kawagoe (JP); Genta Amakawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 235 days.

(21) Appl. No.: 12/842,467

(22) Filed: Jul. 23, 2010

(65) Prior Publication Data

US 2011/0019897 A1  Jan. 27, 2011

(30) Foreign Application Priority Data

Jul. 24, 2009 (JP) ................................ 2009-173473

(51) Int. Cl.
- *G06T 7/00* (2006.01)
- *G06K 9/34* (2006.01)
- *G06K 9/00* (2006.01)

(52) U.S. Cl.
CPC ............ *G06T 7/0012* (2013.01); *G06T 7/0083* (2013.01); *G06K 9/0014* (2013.01); *G06T 2207/30024* (2013.01)
USPC .......................................... 382/133; 382/128

(58) Field of Classification Search
USPC ......................................................... 382/133
See application file for complete search history.

(56) References Cited

U.S. PATENT DOCUMENTS

| | | | |
|---|---|---|---|
| 6,137,899 A | 10/2000 | Lee et al. | |
| 6,716,588 B2 | 4/2004 | Sammak et al. | |
| 7,796,815 B2 * | 9/2010 | Muschler et al. | ............. 382/173 |
| 2008/0015786 A1 | 1/2008 | Ramer et al. | |
| 2011/0019898 A1 | 1/2011 | Takagi et al. | |

FOREIGN PATENT DOCUMENTS

| | | |
|---|---|---|
| JP | 2005-227097 A | 8/2005 |
| WO | WO 2004/020656 A1 | 3/2004 |

OTHER PUBLICATIONS

"Analysis Software Operation, Celaview RS100, ver. 1.4, p. 3-17", published by Olympus Corporation (and English translation thereof).
U.S. Appl. No. 12/842,550, filed Jul. 23, 2010; First Named Inventor: Kosuke Takagi; Title: "Cell-Image Analyzing Apparatus".
Japanese Office Action dated Feb. 26, 2013 (and English translation thereof) issued in counterpart Japanese Application No. 2009-173473.

* cited by examiner

*Primary Examiner* — Hiep V Nguyen
(74) *Attorney, Agent, or Firm* — Holtz Holtz Goodman & Chick PC

(57) ABSTRACT

A cell-image analyzing apparatus is intended to analyze, using a cell image, a cell collective that forms a colony, and is provided with a computer. The cell-image analyzing apparatus has an image analysis software that makes the computer function as: a boundary element extracting means for extracting boundary elements of subjects upon analyzing the cell image; a possible colony region determining means for determining, as a possible colony region, a region surrounded by boundary elements of subjects and having a size greater than a first criterion value; and a colony region determining means for determining, in the possible colony region, a region containing more than a predetermined number of clustered regions each being surrounded by boundary elements of subjects and having a size smaller than a second criterion value, as a colony region.

4 Claims, 10 Drawing Sheets

FIG.4A  FIG.4B  FIG.4C
AMOUNT OF
BOUNDARY ELEMENTS
OF SUBJECTS:
LARGE
AMOUNT OF
BOUNDARY ELEMENTS
OF SUBJECTS:
MODERATE
AMOUNT OF
BOUNDARY ELEMENTS
OF SUBJECTS:
SMALL
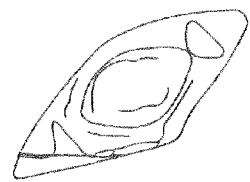
FIG.5
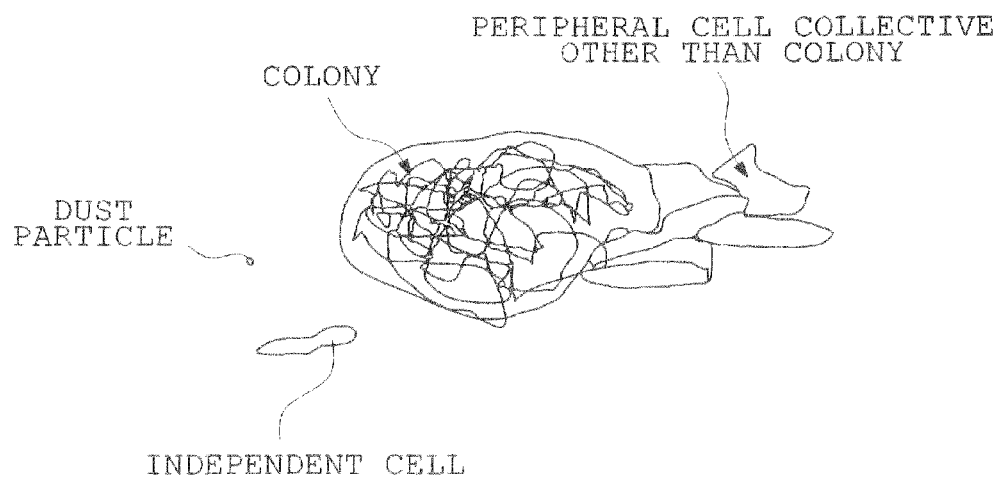

FIG.6A  ORIGINAL CELL STATE
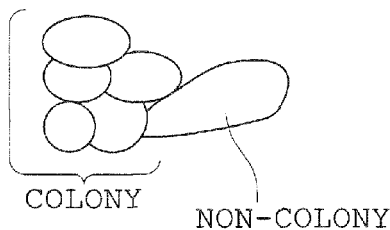
COLONY    NON-COLONY
FIG.6B  EXTRACTION OF BOUNDARY ELEMENTS OF SUBJECTS
FIG.6C
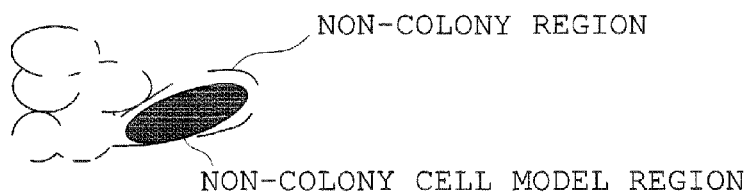
NON-COLONY REGION
NON-COLONY CELL MODEL REGION
FIG.6D
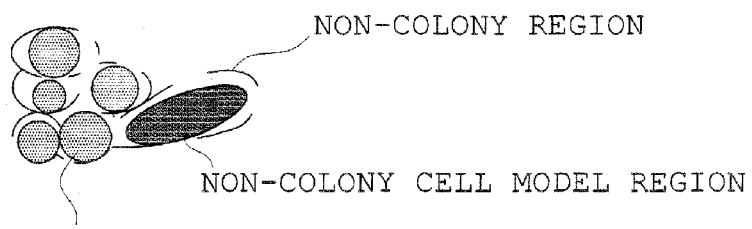
NON-COLONY REGION
NON-COLONY CELL MODEL REGION
LARGEST CIRCLE HAVING RADIUS SMALLER THAN NON-COLONY CELL MODEL REGION AND ENCIRCLING NO BOUNDARY ELEMENT

HIGH-DENSITY REGIONS REGARDING BOUNDARY
ELEMENTS OF SUBJECTS.

CELL IN
COLONY REGION

CELL IN
NON-COLONY REGION

CELL-IMAGE ANALYZING APPARATUS

This application claims benefits of Japanese Patent Application No. 2009-1.73473 filed in Japan on Jul. 24, 2009, the contents of which are hereby incorporated by reference.

BACKGROUND OF THE INVENTION

1) Field of the Invention

The present invention relates to a cell-image analyzing apparatus for automatically analyzing a collective of clustered cells (i.e. cell colony) using cell images.

2) Description of the Related Art

Analysis of a cell colony is conducted normally for observing cells as cultured. As an apparatus for conducting analysis of a cell colony, there is conventional one, for example, referred to in the operation manual "Analysis Software Operation, CELAVIEW RS100", ver. 1.4, pp. 3-17, published by Olympus Corporation.

When special cells such as stem cells or ordinary cancer cells are cultured, the cells divide and grow. In such a situation, cells often cluster to form a colony. Therefore, automatic analyses of colonies are very frequently needed.

Cell analyses intended for colonies as subjects include various types such as those to determine whether cultured cells form a colony or not, dimensions of a colony, growth speed of a colony, etc. Upon analyzing such information on colonies, a screening, for example, of agents that promote or inhibit growth is made. Since a large number of samples and cell images are required for screening of agents in either cell analysis, it is necessary to automatically conduct the analysis of colonies.

A problem peculiar to colony analysis is in that, in a situation where a cell collective that forms a colony and cells other than those exist close to each other, it is necessary to distinguish the cell collective that forms a colony from the remaining cells. For example, there are some situations where some cells, out of cultured cells, form a colony and the remaining cells independently exist without forming a colony. Regarding stem cells, in particular, immature or undifferentiated cells form a colony while mature or differentiated cells independently exist without forming a colony. In such a case, a cell collective that forms a colony should be distinguished from mature or differentiated cells which independently exist.

As another example, there is a situation where plural kinds of cells coexist and only one kind of the cells form a colony.

As still another example, there is a situation where cells called "feeder cells" are simultaneously cultured with subject cells, for promoting growth of the subject cells or keeping alive the subject cells. In this case, it is necessary to distinguish the cell regions forming a colony, as the subject, and the remaining cell regions including the feeder cells.

SUMMARY OF THE INVENTION

A cell-image analyzing apparatus of the present invention is intended to analyze, using a cell image, a cell collective that forms a colony, and is provided with a computer. The cell image analyzing apparatus has an image analysis software that makes the computer function as a boundary element extracting means for extracting boundary elements of subjects such as cells, intracellular organelles, and dust particles, upon analyzing the cell image; a possible colony region determining means for determining, as a possible colony region, a region surrounded by boundary elements of subjects and has a size greater than a first criterion value; and a colony region determining means for determining, in the possible colony region determined via the possible colony region determining means, a region that contains more than a predetermined number of clustered regions each being surrounded by boundary elements of subjects and having a size smaller than a second criterion value, as a colony region.

In the cell-image analyzing apparatus of the present invention, it is preferred that the boundary element extracting means extracts, as boundary elements of subjects, pixel portions where luminance greatly changes and that the colony region determining means has the function of digitizing intricacy of boundary elements of subjects and of dividing the possible colony region into a colony region and a non-colony region in accordance with the intricacy of boundary elements as digitized.

In the cell-image analyzing apparatus of the present invention, it is preferred that the colony region determining means sets, in the possible colony region determined via the possible colony region determining means, evaluation regions having a uniform shape and size, detects values of boundary elements of subjects encircled in the evaluation regions in terms of number of pixels, and gives the detected values as the intricacy.

In the cell-image analyzing apparatus of the present invention, it is preferred that the colony region determining means has the function of setting, as a non colony cell model region, in the possible colony region, a circle, an ellipse, a square or other figure with a certain size, which is determined in reference to the minimum size of a cell outside a colony as a criterion, and of detecting, upon shifting the position of the non-colony cell model region in the possible colony region, a region where the non-colony cell model region is allowed to be set without encircling any boundary element of subjects, as a region of a non-colony cell.

In the cell-image analyzing apparatus of the present invention, it is preferred that the colony region determining means further has the function of determining regions of individual cells other than the non-colony cell by setting a largest circle that has a radius smaller than the non-colony cell model region and that encircles no boundary element and repeating this step of setting a circle inside the possible colony region.

In the cell-image analyzing apparatus of the present invention, it is preferred that the colony region determining means has the function of predicting that, upon growing a marked region from an arbitrary origin on the boundary elements of subjects in the possible colony region by repeating the process of incorporating adjacent points into the marked region until the marked region contains a preset average number of boundary pixels (average value (number of pixels) boundary elements) for a single cell, the marked region as containing the average number of boundary pixels is a region occupied by a single cell inside the possible colony region.

In the cell-image analyzing apparatus of the present invention, it is preferred that the colony region determining means further has the function of determining, in the possible colony region, whether each region predicted as occupied by a single cell belongs to a colony region or a non-colony region based on a morphologic characteristic.

In the cell-image analyzing apparatus of the present invention, it is preferred that the morphologic characteristic is circularity.

According to the present invention, it is possible to provide a cell-image analyzing apparatus that is capable of automatically analyzing a cell image, to be specific, accurately determining, in a region in which regions forming a colony and regions not forming a colony coexist, the regions forming a colony and then acquiring and outputting information such as position and size of the regions forming a colony.

These and other features and advantages of the present invention will become apparent from the following detailed description of the preferred embodiment when taken in conjunction of the accompanying drawings.

BRIEF DESCRIPTION OF THE DRAWINGS

FIGS. 4A, 4B and 4C are explanatory diagrams for illustrating states of extraction of boundary elements of subjects from cell images by analysis of the cell images using the cell-image analyzing apparatus of this embodiment, where FIG. 4A shows a state where a large number of boundary elements of subjects are extracted, FIG. 4B shows a state where a normal number of boundary elements of subjects are extracted, and FIG. 4C shows a state where a small number of boundary elements of subjects are extracted.

FIG. 5 is a schematic diagram that shows one example of individual regions delimited by using boundary elements of subject in a cell image.

FIGS. 6A, 6B, 6C and 6D are explanatory diagrams that show one example of the cell-image analysis procedure according to the second mode in the cell-image analyzing apparatus of this embodiment, where FIG. 6A shows the original cell state (cell image), FIG. 6B shows the state of extracting boundary elements of subjects from the cell image of FIG. 6A, FIG. 6C shows the state of detecting a non-colony cell region, upon setting a non-colony cell model region in the image with the extracted boundary elements of FIG. 6B, and FIG. 6D shows the state of determining regions of individual cells other than the non-colony cell, upon setting a circle which is a largest circle encircling no boundary element of subjects with a radius smaller than the non-colony cell model region, in the image with the detected non-colony cell region of FIG. 6C.

FIG. 7A shows the state of evaluating intricacy of boundary elements of subjects upon setting evaluation regions having a uniform shape and size in the possible colony region, and FIG. 78 shows a series of regions evaluated as high-density regions regarding boundary elements of subjects.

FIG. 8A shows the basic method of predicting a region occupied by a single cell in the possible colony region by using boundary elements of subjects, FIG. 8B schematically shows the state of predicting a region occupied by a single cell in the possible colony region using boundary elements of subjects in the situation where boundary elements of subjects exist not only on the circumference of the cell but also inside the cell, and FIG. 8C schematically shows the state of predicting a region occupied by a single cell in the possible colony region using boundary elements of subjects in the situation where a part of the boundary elements are missing.

FIG. 10B shows the individual cell regions determined by the fourth mode.

FIG. 11A illustrates a single-cell region determined in a colony region, and FIG. 11B illustrates a single-cell region determined in a non-colony region.

DETAILED DESCRIPTION OP THE PREFERRED EMBODIMENTS

Figure 1:
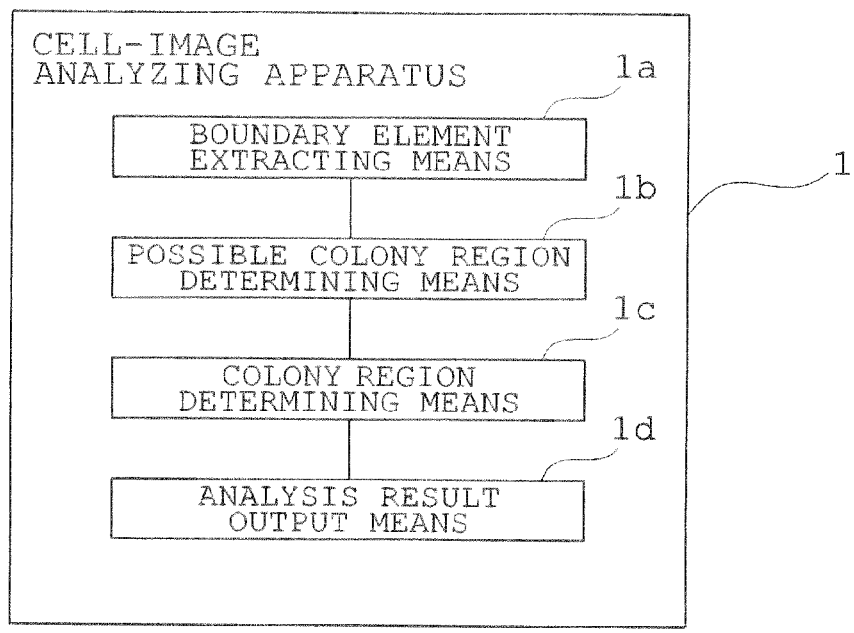
FIG. 1, is a block diagram that shows the entire configuration of a cell-image analyzing apparatus according to one embodiment of the present invention.
Figure 2:
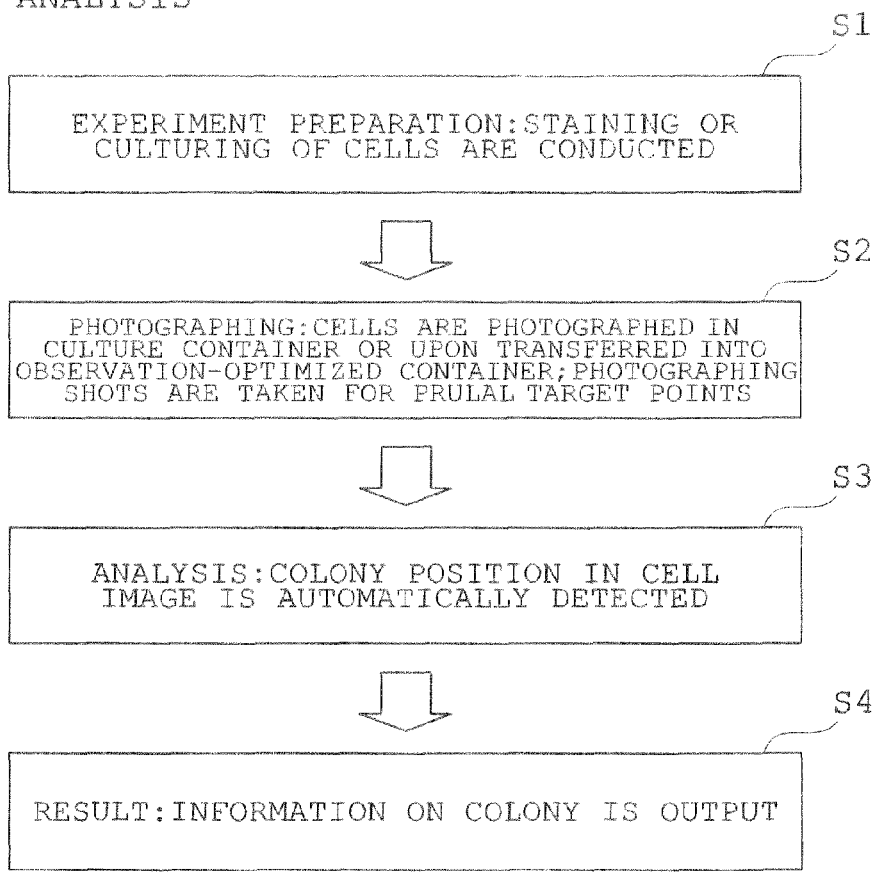
FIG. 2, is a flow chart that shows the entire procedure of cell image analysis, from photographing for a cell image through analysis of the cell image using the cell-image analyzing apparatus of this embodiment.
Figure 3:
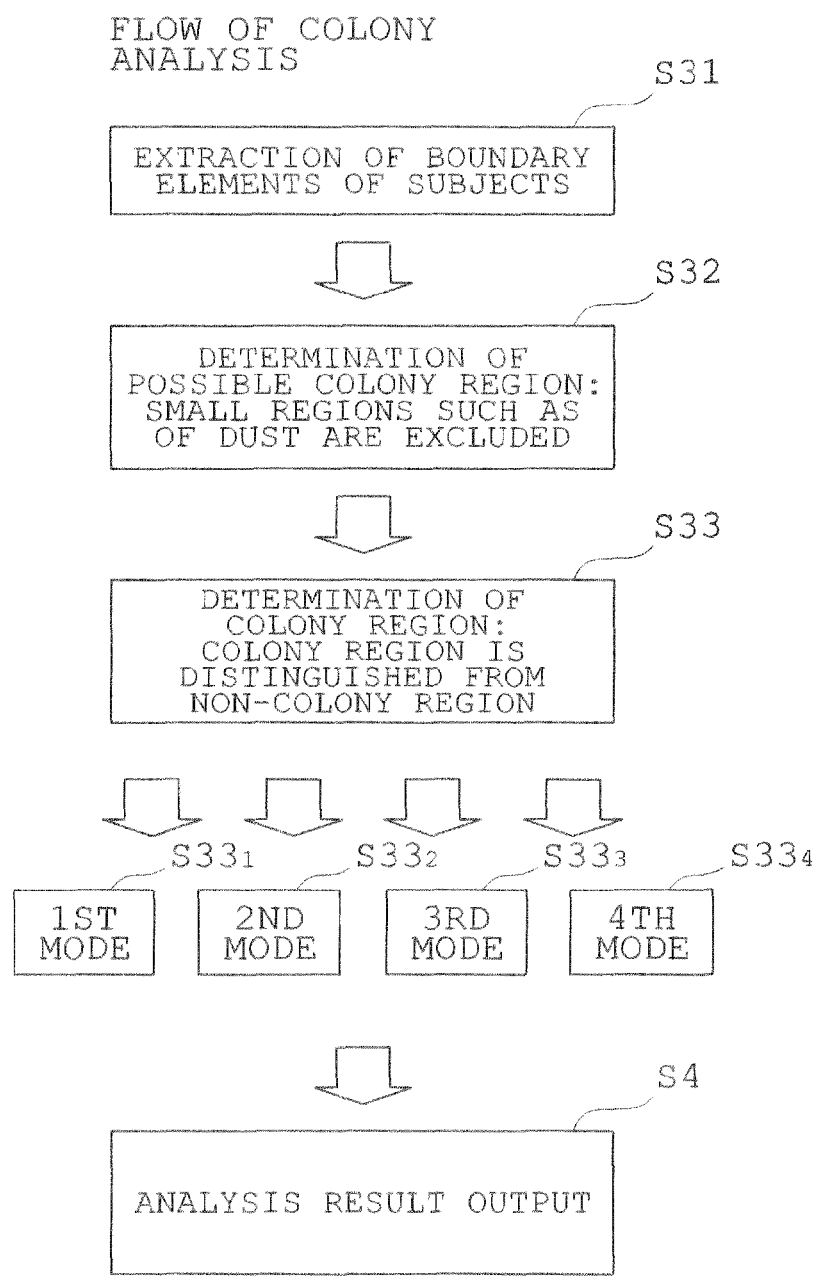
FIG. 3 is a flow chart that shows the operation procedure ending with determination of a colony region by analyzing a cell image, using the cell-image analyzing apparatus of this embodiment.

FIG. 1 is a block diagram that shows the entire configuration of a cell-image analyzing apparatus according to one embodiment of the present invention. FIG. 2. is a flowchart that shows the entire procedure of cell-image analysis, from photographing for a cell image through analysis of the cell image using the cell-image analyzing apparatus of this embodiment. FIG. 3 is a flow chart that shows the operation procedure ending with determination of a colony region by analyzing a cell image, using the cell-image analyzing apparatus of this embodiment.

The cell-image analyzing apparatus 1 of this embodiment is provided with a computer, and conducts analysis of a cell collective that, forms a colony, using a cell image captured via a cell-image photographing apparatus such as a microscopic photographing apparatus. The cell-image analyzing apparatus has an image analysis sot software that makes the computer function as a boundary element extracting means 1$a$, a possible colony region determining means 1$b$, and a colony region determining means 1$c$.

The boundary element extracting means 1$a$ extracts line segment elements that form boundaries of subjects such as cells, intracellular organelles, and dust particles. The possible colony region determining means 1$b$ determines, as a possible colony region, a region surrounded by boundary elements of subjects and has a size greater than a first criterion value. The colony region determining means 1$c$ determines, in the possible colony region determined via the possible colony region determining means 1$b$, a region that contains more than a predetermined number of clustered regions each being surrounded by boundary elements of subjects and having a size smaller than a second criterion value, as a colony region.

The image analysis software is configured to make the computer function as an analysis result output means 1$d$ also for outputting a result of cell-image analysis.

An analysis of a cell image using the cell-image analyzing apparatus of this embodiment thus configured is made as follows.

One example of the entire procedure of cell image analysis from photographing for a cell in age through determination of a colony in the cell image via image analysis is shown in FIG.

2. The cell-image analysis procedure is completed by serially conducting an experiment (photographing) preparation step (Step S1), a photographing step (Step 22), a cell image analysis step, (Step S3), and an analysis result output step (Step S4). The cell-image analyzing apparatus of this embodiment commences its operation at the cell-image analysis step.

Experiment (Photographing) Preparation Step (Step 1)

At the experiment preparation step, staining or culturing of cells is made. Regarding the cell-image photography, there are known, as typical ones, techniques of acquiring a fluorescence image upon treatment such as staining and techniques of acquiring a transmitted cell image without staining using an appropriate transmitted illumination system. Of these techniques of acquiring a transmitted cell image, there are known several techniques such as that in which a phase-contrast microscopic image is acquired or a transmitted image via a tilted illumination system is acquired.

The cell-image analyzing apparatus of this embodiment analyzes cell images using cell-image analysis methods that are commonly applicable to cell images acquired through these techniques.

Staining

Whether or not cell staining should be made depends on purpose and/or condition of the experiment. When cells are stained, they are killed or changed from their proper state. Therefore, in general, in an experiment where cells are observed as living, staining is not made. On the other hand, since the fluorescence photography allows a much distinct image to be acquired in comparison with the transmitted illumination photography. Therefore, in order to perform automatic cell analysis, it is desirable to conduct the experiment upon fluorescence staining.

Photographing Step (Step S2)

Regarding photographing for a cell image, cells stained or cultured in a culture container are photographed with a microscopic photographing apparatus not shown, as in the same container or upon transferred into a different container optimized for observation. In many cases, the number of colonies and the location of colonization are unknown at the beginning of experimentation. Therefore, at least at the beginning of experimentation, photographing shots are taken for a plurality of target points, to cover the entire region in the container. In an experimentation system in which the experiment is repeated for observation of cell growth, observation (photographing) is made for a neighborhood covering the position of the colony detected in the latest experiment at its center.

Cell-Image Analysis Step (Step S3)

The cell-image analyzing apparatus of this embodiment automatically analyzes a cell image captured after the experiment preparation step and the photographing step (Step S1, Step S2) in accordance with the analysis procedure shown in FIG. 3. To be specific, the analysis is made by extracting boundary elements of subjects from the cell image (Step S31), then determining a possible colony region (Step S32), and then determining a colony region in the possible colony region (Step S33). The operation of these steps is described in detail below.

Extraction of Boundary Elements of Subjects (Step 31)

First, the boundary element extracting means 1a extracts boundary elements of subjects in a cell image. Here, the boundary elements of subjects are line segments that represent boundaries of characteristic subjects such as cells, intracellular organelles and dust particles. The boundary elements of subjects can be extracted using luminance and luminance difference within, the region of the cell image.

In general, a region where a cell exists and a region where no cell exists differ in image brightness (luminance characteristic) irrespective of whether the image is a transmitted image or a fluorescence image. Using this principle, detection is made for a region of picture elements such as pixels where luminance or luminance difference greatly changes beyond a preset criterion value of variation of the luminance or luminance difference, and this pixel region is extracted as boundary elements.

States of extraction of boundary elements of subjects from cell images by analysis of the cell images using the cell-image analyzing apparatus of this embodiment are illustrated in FIGS. 4A-4C. FIG. 4A shows a state where a large number of boundary elements of subjects are extracted. FIG. 4B shows a state where a normal number of boundary elements of subjects are extracted, and FIG. 4C shows a state where a small number of boundary elements of subject are extracted.

Determination of Possible Colony Region (Step S32)

Then, the possible colony region determining means 1b conducts determination of a possible colony region using boundary elements of subjects. Since the analysis subject of the cell-image analyzing apparatus of this embodiment is a colony, a region that is too small to contain a smallest unit subject of a colony is excluded from the analysis subject even if it contains boundary elements of subjects. Whereby, a region that possibly includes a colony is determined as a possible colony region.

To be specific, the possible colony region determining means first delimits individual regions using the boundary elements of subjects. That is, a region surrounded by boundary elements of subjects along with its neighboring region is delimited as one region. Regarding the boundary elements of subjects used to delimit the individual regions, in some cases lines they form are partially broken where they fail to be extracted by the boundary element extracting means 1b as boundary elements of subjects, because the variation of luminance or luminance difference is small and indistinct in some pixel regions. Regarding boundary elements that form partially broken lines, the possible colony region determining means 1b recognizes boundary elements separated from each other at a distance smaller than a preset value as boundary elements of an identical subject, and interpolates the space between these boundary elements with certain line segment elements. The configuration may be made so that this preset value is programmable by a user preceding the analysis procedure.

At this stage, in a cell image with extracted boundary elements of subjects, there are delimited individual regions, for example as shown in FIG. 5, of a dust particle, an independent cell, a cell collective that forms a colony, and a peripheral cell collective other than the colony.

Then, the possible colony region determining means 1b determines a region that has a size greater than a predetermined value of a parameter, such as area, representing the size of regions, as a possible colony region. This value is preliminarily set, as a first criterion value, to be greater than an independent cell. At this stage, of the regions shown in FIG. 5, the regions of the independent cell and of the dust particle smaller than the independent cell are excluded.

Determination of Colony Region (Step S33)

Then, the colony region determining means is determines, in the possible colony region having a substantial size greater than the first criterion value as determined via the possible colony region determining means 1b, a region satisfying the following conditions (2) and (3) as a region where cells are clustered to form a colony.

Conditions of Colony Detection

The cell-image analyzing apparatus of this embodiment is configured to detect a region that satisfies the following conditions (1)-(3) as a colony:

Condition (1) the region in concern has a substantial size (greater than a first criterion value);

Condition (2) individual subjects (cells) inside the region in concern are small (smaller than a second criterion value);

Condition (3) the number of these subjects (cells) is greater than a predetermined number.

Processing Corresponding to Condition (1)

Condition (1) is a condition for determining a possible colony region as a region that possibly includes a colony. As described above, in the process of determining a possible colony region (Step S32), the possible colony region determining means 1b determines a region satisfying Condition (1) as a possible colony region. Therefore, small regions such as dust particles and independent cells are excluded.

Processing Corresponding to Condition (2)

Condition (2) is a condition for excluding a region in which cells are clustered but the individual clustered cells are large. The phenomenon of cell clustering is not unique to colonies, but commonly presents itself in cells in culture. In particular, the phenomenon that mature cells simply exist close together to be clustered is very commonly seen.

Therefore, in the cell-image analyzing apparatus of this embodiment, the colony region determining means 1c predicts the size (for example, area) of each of individual subjects (cells) inside a possible colony region determined via the possible colony region determining means 1b and compares it with the second criterion value for the purpose of distinguishing between a collective of mature cells and a colony. Depending on the experiment, conditions and experiment purposes, some experimentation systems do not require such distinguishing. Therefore, in the cell-image analyzing apparatus of this embodiment, it is preferred that whether the colony region determining process by the colony region determining means 1c is necessary or not is preliminarily programmable by the user.

In the cell-image analyzing apparatus of this embodiment, it is preferred that a plurality of processing modes such as the later described first to fourth modes are selectable by a user to be used for distinguishing between cells in a colony region and cells in a non-colony region. The difficulty in extraction of boundary elements of subjects differs by experimentation system. Therefore, it is preferred that the user can freely choose, for each analysis, an appropriate processing mode among a plurality of processing modes such as the first to fourth modes described later.

Challenges in Determination of Colony Region

C-1—Difficulty in Recognition of Each of Clustered Cells

In determination of a colony region, if individual cells can be recognized upon determination of boundary elements of the individual subjects in the possible colony region, it is easy to determine satisfaction/non-satisfaction of Conditions (1)-(3). However, since cells usually are clustered with an intricate pattern in a colony region, there is a problem that recognition of the individual cells is inherently difficult.

C-2—Challenges Derived from Difficulty in Extraction of Boundary Elements of Subjects Also, since accurate detection of boundary elements of subjects is difficult, accurate determination of a colony region is made difficult according as a large amount of noise is detected or, in contrast, regions which should have been detected as boundary elements of subjects are overlooked in extraction of boundary elements of subjects. That is, in extraction of boundary elements of subjects, the following problems are raised: (1) not only boundary elements of cells, but also boundary elements of intracellular organelles are detected; (2) overlooking of boundary elements of cells occurs; (3) three-dimensional mutual overlapping of, cells complicates boundary elements of the cells.

Therefore, in the cell-image analyzing apparatus of this embodiment, in order to solve these problems, the colony region determining means is configured to use, in accordance with a choice by a user, any of the first mode to the fourth mode (Steps $S33_1$-$S33_4$) as a processing mode for determining whether each of cells satisfies Condition (2) as a unit component of a cell collective in a possible colony region in the process of colony region determination (Step S33). Explanations are made on the processing modes optimal for the situations (i)-(iv) below, respectively:

(i) recognition of individual cells is easy;

(ii) small amount of boundary elements of subject is extracted;

(iii) moderate amount of boundary elements of subjects is extracted;

(iv) large amount of boundary elements of subjects is extracted.

Processing Mode for Individually Determining Whether Each of Cells Satisfies Condition (2): First Mode (Step $S33_1$)

The first mode is a processing mode preferable in the situation where the cell image is sufficiently clear and is free from three-dimensional overlapping of cells, to facilitate recognition of individual cells (the situation of (i) above). In the first mode, the colony region determining means 1c determines the regions delimited by boundary elements of subjects as individual cells, and detects regions of those cells respectively satisfying Condition (2).

Processing Mode for Individually Determining Whether Each of Cells Satisfies Condition (2): Second Mode (Step $S33_2$)

FIGS. 6A-6D are explanatory diagrams that show one example of the cell-image analysis procedure according to the second mode in the cell-image analyzing apparatus of this embodiment, where FIG. 6A shows the original cell state (cell image), FIG. 6B shows the state of extracting boundary elements of subjects from the cell image of FIG. 6A, FIG. 6C shows the state of detecting a non-colony cell region, upon setting a non-colony cell model region in the image with the extracted boundary elements of FIG. 6B, and FIG. 6D shows the state of delimiting regions of individual cells other than the non-colony cell, upon setting a circle which is a largest circle encircling no boundary element of the subjects with a radius smaller than the non-colony cell model region, in the image with the detected non-colony cell region of FIG. 6C.

The second mode is a processing mode preferable in the situation where a small amount of boundary elements of subjects are extracted and only boundaries of individual cells are detected as boundary elements of subjects (the situation, of (ii) above). We here suppose, as a particular situation where the second mode is applied, an experimentation system in which a few elements are detected as boundary elements of subjects depending on conditions regarding various factors such as boundary elements of intracellular organelles and noise. Also, we suppose that the original cell state in this experimentation system is as illustrated in FIG. 6A, that boundary elements of subjects are extracted as shown in FIG. 6B, and that the region presented with the boundary elements of subjects shown in FIG. 6B is determined as a possible colony region.

In this case, the colony region determining means 1c sets, as a non-colony cell model region, in the possible colony region, a circle, an ellipse, a square or other figure with a certain size, which is determined in reference to the minimum size of a cell in a non-colony region as a criterion. Then the colony region determining means 1c detects a region where a non-colony cell exists, upon making the non-colony cell model region scan (shift the position) in the possible colony region. To be specific, if there is a region where the non-colony cell model region is allowed to be set without encircling any boundary element of subjects, this region is detected as a region containing a non-colony cell (non-colony cell region).

If it is difficult, to delimit a region in concern in the possible colony region by boundary elements of subjects (for example, in the case where a simple closed region cannot be formed by boundary elements of subjects) the colony region determining means 1c further sets a largest circle that has a radius smaller than the non-colony cell model region and that encircles no boundary element, as shown in FIG. 6D, for example. By repeating this step of setting a circle inside the possible colony region, the colony region determining means is delimits regions of individual cells other than the non-colony cell.

Processing Mode for Individually Determining Whether Each of Cells Satisfies Condition (2): Third Mode (Step S33$_3$)

Figure 7A:
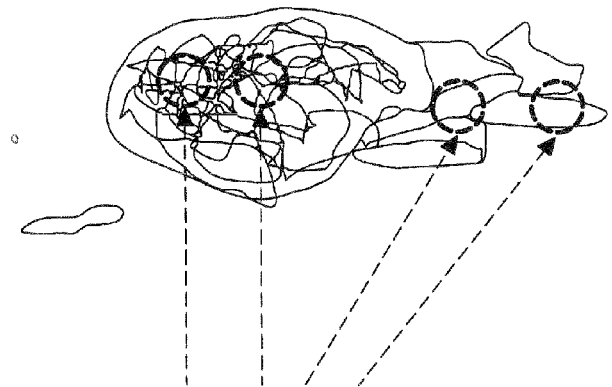
FIGS. 7A and 7B are explanatory diagrams that show one example of the cell-image analysis procedure according to the third mode in the cell-image analyzing apparatus of this embodiment, where
Figure 7B:
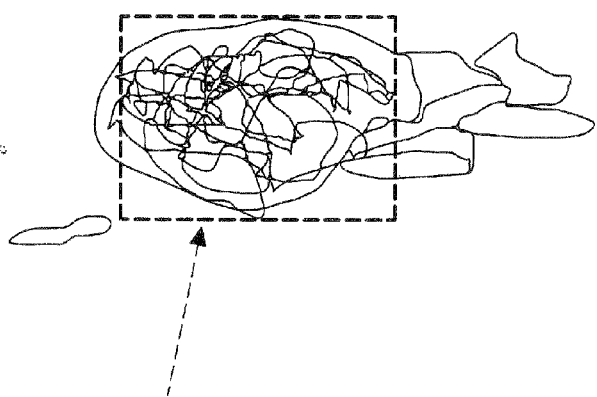

FIGS. 7A-7B are explanatory diagrams that show one example of the cell-image analysis procedure according to the third mode in the cell-image analyzing apparatus of this embodiment, where FIG. 7A shows the state of evaluating intricacy of boundary elements of subjects upon setting evaluation regions having a uniform shape and size in the possible colony region, and FIG. 7B shows a series of regions evaluated as high-density regions regarding boundary elements of subjects.

The third mode is a processing mode preferable in the situation where a moderate amount of boundary elements of subjects are extracted and delimitation of individual cell regions, if by the second mode, would be affected by noise of boundary elements of subjects or so (the situation of (iii) above). In the third mode, as shown in FIG. 7A for example, the colony region determining means 1c sets evaluation regions having a uniform shape and size (in this example, circular regions) in the possible colony region, digitizes the amount of boundary elements of subjects encircled in the evaluation regions in terms of number of pixels, and gives the detected values as the intricacy. Then, the colony region determining means 1c determines whether each of the evaluation regions is a colony region or a non-colony region in accordance with the detected intricacy. For example, if the detected intricacy is greater than a criterion value preliminarily set for evaluation, the colony region determining means 1c evaluates the inside of the circular region as a high-density region containing clustered cells forming a colony, and determines a series of regions evaluated, as high-density regions as shown in FIG. 7B as a colony region.

Processing Mode for Individually Determining Whether Each of Cells Satisfies Condition (2): Fourth Mode (Step S33$_4$)

Figure 8A:
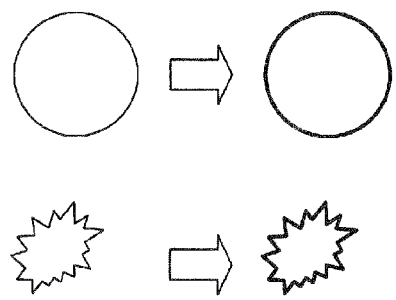
FIGS. 8A, 8B and 8C are explanatory diagrams that show one example of the cell-image analysis procedure according to the fourth mode in the cell-image analyzing apparatus of this embodiment, where
Figure 8B:
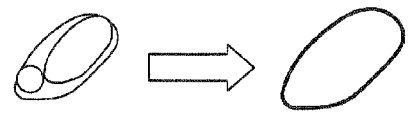
Figure 8C:
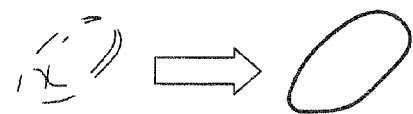

FIGS. 8A-8C are explanatory diagrams that show one example of the cell-image analysis procedure according to the fourth mode in the cell-image analyzing apparatus of this embodiment, where FIG. 8A shows the basic method of predicting a region occupied by a single cell in the possible colony region by using boundary elements of a subject, FIG. 8B schematically shows the state of predicting a region occupied by a single cell, in the possible colony region using boundary elements of subjects in the situation where the boundary elements of subjects exist not only on the circumference of the cell but also inside the cell, and FIG. 8C schematically shows the state of predicting a region occupied by a single cell in the possible colony region using boundary elements of subjects in the situation here a part of the boundary elements are missing.

The fourth mode is a processing mode preferable in the situation where a large amount of boundary elements of subjects are extracted and analysis of the cell image is difficult by the third mode because of much denser boundary elements of subjects (the situation of (iv) above). In the fourth mode, the colony region determining means 1c grows a marked region from an arbitrary origin on the boundary elements of subjects in the possible colony region by repeating the process of incorporating adjacent points into the marked region until the marked region contains a preset "average number of boundary pixels", and predicts that the marked region as containing "average number of boundary pixels" is a region occupied by a single cell inside the possible colony region. Here, "average number of boundary pixels" is an average value of boundary pixels (number of pixels) for a single cell.

If a region occupied by a single cell is predicted via the processing of the fourth mode, as shown in FIG. 8A for example, a cell having a circular shape occupies a large area and a cell having a complicated contour occupies a small area. According to the processing of the fourth mode, as shown in FIG. 8B for example, even in the situation where boundary elements of subjects exist not only on the circumference of the cell but also inside the cell, a region occupied by the single cell in the possible colony region is predictable using the boundary elements of subjects. Further, in the situation where apart of the boundary elements is missing (broken) a region occupied by a single cell in the possible colony region is predictable using the boundary elements of subjects upon changing the value the "average number of boundary pixels" in accordance with the situation.

Figure 9:
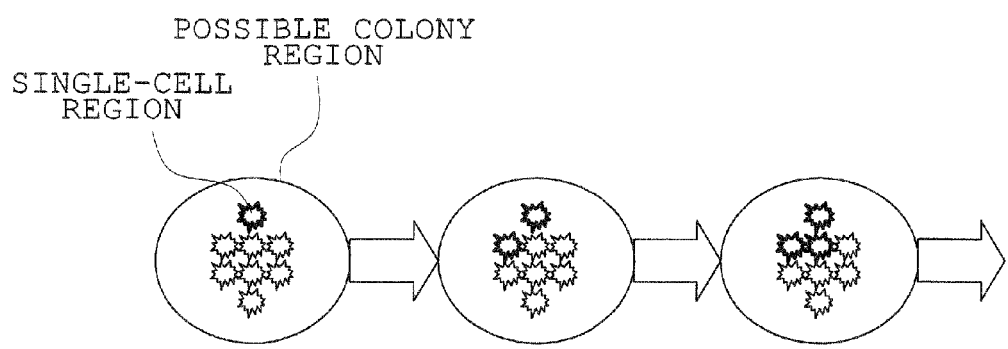
FIG. 9 is an explanatory diagram that schematically shows the process of determining individual cells in a possible colony region that contains a plurality of clustered cells, by the cell-image analyzing apparatus of this embodiment using the fourth mode.

FIG. 9 is an explanatory diagram that schematically shows the process in which, according to the fourth mode, the colony region determining means 1c determines individual cells in a possible colony region that contains a plurality of clustered cells. First, the colony region determining means 1c determines a "single-cell region" starting at an arbitrary origin on the boundary elements of subjects in the possible colony region by the fourth mode. Then, the colony region determining means 1c determines another single-cell region in the similar manner by the fourth mode, at a position adjacent to this single-cell region as first determined. By repeating this processing one after another for adjacent positions, individual cell regions in the possible colony region are determined.

In a colony having a complicated structure, boundary elements of each cell do not necessarily corresponds to the boundary of the cell. Therefore, the cell-image analyzing apparatus of this embodiment is configured so that the average value of boundary elements of subjects per cell is preliminarily set as the "average number of boundary pixels" for processing of the fourth mode by the colony region determining means 1c. This configuration allows individual cell regions having the average number of boundary pixels to be determined.

Figure 10A:
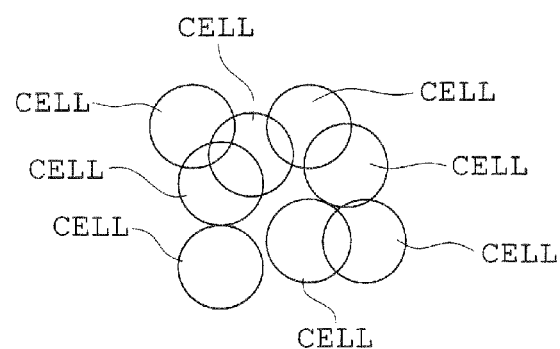
FIGS. 10A and 10B are explanatory diagrams that schematically show cell regions determined by the fourth mode in a possible colony region that contains clustered cells, in the cell-image analyzing apparatus of this embodiment, where FIG. 10A schematically shows the state where cells are clustered.
Figure 10B:
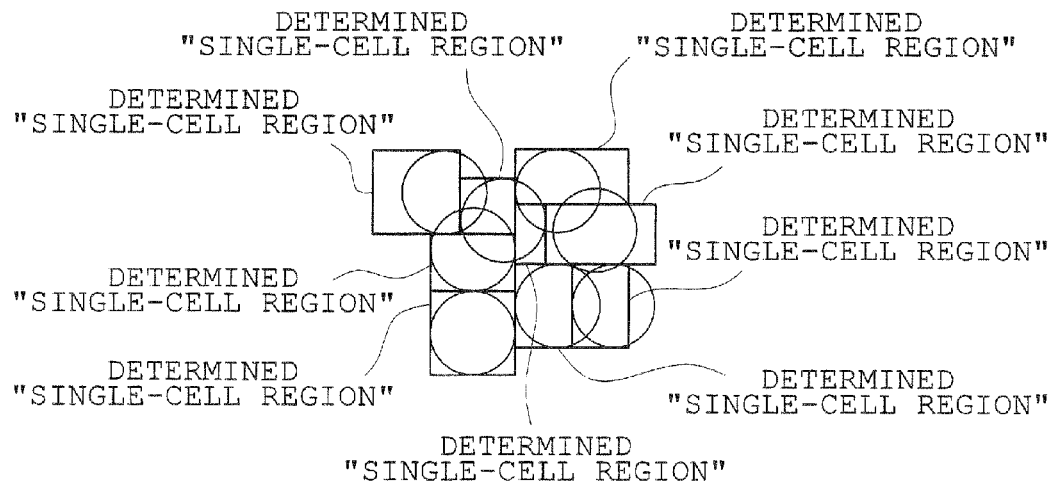

FIGS. 10A and 10B are explanatory diagrams that schematically show cell regions determined by the fourth mode in a possible colony region that contains clustered cells, where FIG. 10A schematically shows the state where cells are clustered, and FIG. 10B shows regions of individual cells determined by the fourth mode. In FIG. 10B, the square frames represent the individual cell regions. Here, a single-cell region is schematically presented as a square. As shown in FIG. 10, individual single-cell regions determined by the "average number of boundary pixels" are narrowed as the cells are more densely clustered to form further intricate cell boundaries.

Figure 11A:
FIGS. 11A and 11B are explanatory diagrams that illustrate the morphologic characteristic of individual single-cell regions determined by the fourth mode, where
Figure 11B:

A non-colony cell has a simple shape, and a non-colony cell region determined by the fourth mode is different from a cell in a colony region in size and morphologic characteristic such as circularity. Therefore, in the fourth mode, the colony region determining means 1c is configured to classify the individual regions in a possible colony region by morphologic characteristic. This technique also makes it possible to distinguish between a cell in a colony region and a cell in a non-colony region. For example, in a region having intricate boundary elements such as a colony, single-cell regions determined there are averaged to have a shape approximate to a circle, as shown in FIG. 11A. On the other hand, a mature cell has a small amount of boundary elements and is relatively large, with its single-cell region as determined being approximate to an ellipse, as shown in FIG. 11B. Therefore, in the fourth mode, it is preferred that the colony region determining means 1c distinguishes whether each of single-cell regions belongs to a colony region or a non-colony region in accordance with circularity (parameter taking a smallest value as the shape is a circle, and a larger value as it deviates from the circle).

Processing Corresponding to Condition (3)

Regarding the individual cell regions that have been determined in accordance with one of the processing modes excluding the third mode (i.e. the first triode, the second mode and the fourth mode) for individually determining whether cells in concern satisfy Condition (2), the colony region determining means 1c determines their respective size, and estimates the number of cells contained in each of the possible colony regions using the respective size of the cell regions as determined. Then the colony region determining means 1c determines a region that contains a number of cells, as estimated, greater than the predetermined number as a colony region.

Result Output Step (Step S4)

In the analysis result output step (Step S4), the analysis result output means 1d outputs parameters, such as the size and the estimated number of cells, of regions determined via the cell-image analysis step (Step S3) on a display monitor or a printer not shown.

The cell-image analyzing apparatus of the present invention is useful in fields where analysis of a collective of clustered cells (cell colony) using an image of cells as cultured is required.

What is claimed is:

1. A cell-image analyzing apparatus for analyzing a cell collective that forms a colony using a cell image, wherein the cell-image analyzing apparatus comprises a computer and image analysis software that controls the computer to function as units comprising:
    a boundary element extracting unit for extracting boundary elements of subjects such as cells, intracellular organelles, or dust upon analyzing the cell image;
    a possible colony region determining unit for determining, as a possible colony region, a region surrounded by boundary elements of subjects extracted by the boundary element extracting unit and having a size greater than a first criterion value; and
    a colony region determining unit for determining a colony region, wherein the colony region determining unit divides the possible colony region determined by the possible colony region determining unit into the colony region and a non-colony region;
    wherein the colony region determining unit is configured to predict that, upon growing a marked region from an arbitrary origin on the boundary elements of the subjects in the possible colony region by repeating a process of incorporating adjacent points into the marked region until the marked region contains a preset average number of boundary pixels for a single cell, the marked region containing the average number of boundary pixels is a region occupied by a single cell inside the possible colony region.

2. The cell-image analyzing apparatus according to claim 1, wherein the colony region determining unit is further configured to distinguish, in the possible colony region, whether each region predicted as being occupied by a single cell belongs to a colony region or a non-colony region based on a morphologic characteristic.

3. The cell-image analyzing apparatus according to claim 2, wherein the morphologic characteristic is circularity.

4. The cell-image analyzing apparatus according to claim 1, wherein the colony region determining unit is further configured to determine, in the possible colony region, a region that contains more than a predetermined number of regions each of which is predicted as being occupied by a single cell and that has a size smaller than a second criterion value, as the colony region.

* * * * *